United States Patent [19]

Tomihashi et al.

[11] Patent Number: 4,952,653

[45] Date of Patent: Aug. 28, 1990

[54] PROCESS FOR PREPARING FLUORINE-CONTAINING COPOLYMERS

[75] Inventors: Nobuyuki Tomihashi, Takatsuki; Masayuki Yamana, Osaka; Takayuki Araki, Kadoma; Sachio Nomura, Settsu, all of Japan

[73] Assignee: Daikin Industries, Ltd., Osaka, Japan

[21] Appl. No.: 341,992

[22] Filed: Apr. 20, 1989

Related U.S. Application Data

[63] Continuation-in-part of Ser. No. 168,073, Mar. 9, 1988.

[30] Foreign Application Priority Data

| Mar. 10, 1987 | [JP] | Japan | 62-54690 |
| Jul. 29, 1987 | [JP] | Japan | 62-189590 |
| Jul. 29, 1987 | [JP] | Japan | 62-189591 |
| Apr. 20, 1988 | [JP] | Japan | 63-97980 |
| Apr. 20, 1988 | [JP] | Japan | 63-97979 |
| Aug. 25, 1988 | [JP] | Japan | 63-211119 |

[51] Int. Cl.$^5$ .................. C08F 14/20; C08F 14/22; C08F 14/24; C08F 14/26
[52] U.S. Cl. .................. 526/249; 526/250; 526/255; 526/293
[58] Field of Search ............ 526/249, 250, 255, 293

[56] References Cited

U.S. PATENT DOCUMENTS

| 2,514,895 | 4/1950 | Neher et al. |  |
| 2,524,921 | 10/1950 | Minter. |  |
| 3,256,344 | 6/1966 | McTeer. |  |
| 3,429,845 | 2/1969 | Bechtold et al. |  |
| 3,819,562 | 6/1974 | Cargagna. |  |
| 4,015,057 | 3/1977 | Gall. |  |
| 4,151,340 | 4/1979 | Ichimura et al. | 526/249 |
| 4,387,204 | 6/1983 | Zahir et al. | 526/249 |
| 4,611,087 | 9/1986 | Yamashita et al. |  |
| 4,705,887 | 11/1987 | Crivello. |  |
| 4,749,807 | 6/1988 | Lapin et al. |  |

FOREIGN PATENT DOCUMENTS

62-169810  7/1987  Japan .................. 526/249

*Primary Examiner*—Joseph L. Schofer
*Assistant Examiner*—N. Sarofim
*Attorney, Agent, or Firm*—Armstrong, Nikaido, Marmelstein, Kubovcik & Murray

[57] ABSTRACT

Process for preparing fluorine-containing copolymers by using vinyl ether monomer compositions comprising vinyl ethers having a carboxyl acid salt in an amount of 1 to 50% by mole of vinyl ethers having a free carboxyl group. According to the process, the amount of halogen generated can be reduced.

11 Claims, No Drawings

PROCESS FOR PREPARING FLUORINE-CONTAINING COPOLYMERS

CROSS-REFERENCE TO RELATED APPLICATION

This is a continuation-in-part of application Ser. No. 168,073 filed on Mar. 9, 1988.

BACKGROUND OF THE INVENTION

The present invention relates to a process for preparing fluorine-containing copolymers having a carboxyl group which are useful for materials of fluorine resin paints.

Fluorine resins having a carboxyl group can be prepared by copolymerizing vinyl ethers having a carboxyl group and fluoroolefins. However, synthesis of vinyl ethers having a carboxyl group is very difficult. For example, an attempt to synthesize vinyl having a carboxyl group by reacting hydroxyalkyl vinyl ethers with dibasic acid anhydrides (half-esterification) results in failure, because the carboxyl group of the product immediately reacts with the vinyl group of the same product to form a ring.

Therefore, fluorine-containing copolymers having carboxyl groups may be, for example, prepared by copolymerizing fluoroolefins and vinyl ethers having a hydroxyl group, and then reacting the hydroxyl groups in the copolymer with dibasic acid anhydrides (half-esterification) (c.f. Japanese Tokkyo Kokoku No. 49323/1986). The process, however, has a defect that since the half-esterification must be carried out after copolymerization, cheap alcohols which react with the dibasic acid anhydrides cannot be used as solvents in the copolymerization.

As a result of the present inventor's intensive study for preparation of vinyl ethers having a carboxyl group, it has been found that the intramolecular ring closure reaction does not happen when hydroxyalkyl vinyl ethers are reacted with dibasic acid anhydrides in the presence of basic compounds, and that stability of the resulting vinyl ethers can be improved in the form of carboxyl salts with the basic compounds, and also that yield of copolymerization with fluoroolefins can be remarkably increased.

There is well known that electrodeposition coating compositions containing fluorine-containing polymers can give coatings having a remarkably excellent chemical resistance and weatherability in comparison with conventional coating compositions containing acrylic resins (Japanese Tokkyo Kokai Nos. 59676/1987, 127362/1987).

In case that electrodeposition coating is carried out by using compositions containing fluorine-containing polymers, however, various troubles have risen due to the presence of halogen ions. For example, according to the inventors' study, influences of halogen ions in the electrodeposition coating compositions on the electrodeposition coating process or resulting coatings are as follows:

(1) Erosion of Metal of Anode

In the case of anionic electrodeposition coating the article in which articles to be coated is an anode, the presence of fluorine-containing polymers in the coating composition has the worst influence. Especially when articles to be coated are aluminum, an alumite layer is destroyed in the presence of fluorine ion according to the following chemical reaction:

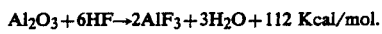

This destruction of alumite layer results in serious defects.

(2) Decrease of stability of electrodeposition coating compositions

Storage stability of the compositions is decreased, because water-solubility and water-dispersibility of fluorine-containing polymers are lowered due to salting out by halogen ions.

(3) Increase of specific electric conductivity

The coulomb yield of electrodeposition coating is lowered due to increase of specific electric conductivity, and also coating defects occur because of a high electrodeposition coating voltage.

Those worse influences occur in the presence of various halogen ions, and particularly influences by fluorine ion are most serious.

On the other hand, in the copolymerization reaction of fluoroolefins with the monomer compositons of vinyl ethers having a carboxyl group, it is impossible to avoid generation of halogen ions. As a result of the inventors' study of the copolymerization reaction, the inventors have found the facts that it is possible to inhibit the generation of halogen ions as much as practicable and to obtain the fluorine-containing copolymers in a high yield by controlling the amount of the vinyl ethers (I) to the vinyl ethers (II) within the particular range.

SUMMARY OF THE INVENTION

The present invention relates to a process for preparing fluorine-containing copolymers by polymerizing fluorine-containing monomers with vinyl ether monomer compositions comprising vinyl ethers (I) having a carboxyl group in the form of salt represented by the formula (I):

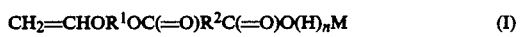

wherein $R^1$ is a divalent aliphatic residue of 2 to 10 carbon atoms, $R^2$ is a divalent organic residue, and M is an alkali metal, or a mono-functional basic compound which contains nitrogen atom or phosphorous atom and has a pKa of 6 to 12, and n is 0 when M is the alkali metal and is 1 when M is other, and vinyl ethers (II) having a free carboxyl group represented by the formula (II):

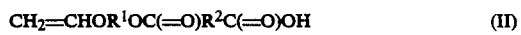

wherein $R^1$ and $R^2$ are as defined above, and said compositions contain the vinyl ethers (I) in an amount of 1 to 50% by mole, preferably 5 to 50% by mole of the vinyl ethers (II).

According to the present invention, it is possible to reduce the amount of halogen ions generated.

DETAILED DESCRIPTION

The vinyl ether monomer compositions used in the present invention have a remarkably improved storage stability in comparison with the vinyl ethers (II) used alone, as described above.

The reason why the mixture of the vinyl ethers (I) and (II) is stable when the vinyl ethers (I) is present in an amount of not less than 1% by mole, particularly not less than 5% by mole of the vinyl ethers (II) is assumed that the concentration of H⊕ which accelerates a ring closure of the vinyl ethers (II) in the mixture is reduced due to buffer effect of the vinyl ethers (I).

The vinyl ethers (I) of the present invention can be prepared by reacting ① hydroxyalkyl vinyl ethers represented by the formula:

$$CH_2=CHR^1OH$$

wherein $R^1$ is as defined above, ② dibasic acid anhydrides represented by the formula:

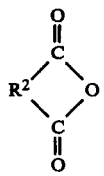

wherein $R^2$ is as defined above, and ③ alkali metal compounds or mono-functional basic compounds which contain nitrogen atom or phosphorous atom and has a pKa (acid dissociation constant in water at 25° C.) of 6 to 12 (hereinafter referred to as "base ③" when the both compounds are not distinguished).

Examples of the hydroxyalkyl vinyl ethers are, for instance, 4-hydroxybutyl vinyl ether, 2-hydroxyethyl vinyl ether, 3-hydroxy-n-propyl vinyl ehter, 2-hydroxyisopropyl vinyl ether, 2-hydroxy-2-methylethyl vinyl ether, 2-hydroxy-1,1-dimethylethyl vinyl ether, 4-hydroxycyclohexyl vinyl ether, 3-hydroxycyclohexyl vinyl ether, 2-hydroxycyclohexyl vinyl ether, 4-hydroxybenzoxy vinyl, and the like.

Examples of the substituent $R^2$ which is contained in the dibasic acid anhydrides and the vinyl ethers (I) or (II) are, for instance, residues represented by the formula (i):

$$\text{—}(CHX^1)_p\text{—}(CX^2)_q\text{—} \quad (i)$$

wherein $X^1$ is hydrogen atom or an alkyl group of 1 to 3 carbon atoms, $X^2$ is hydrogen atom or an alkyl group of 1 to 3 carbon atoms, and p and q are 0 or an integer of 1 to 11, provided that they are not 0 at the same time; residues represented by the formula (ii):

$$\text{—}(CH_2)_r\text{—}(CX^3=CH)_s \quad (ii)$$

wherein $X^3$ is hydrogen atom or an alkyl group of 1 to 3 carbon atoms, r is 0 or an integer of 1 to 3, and s is an integer of 1 to 3; residues represented by the formula (iii):

wherein $R^7$ is —(CHX$^4$)$_t$— in which $X^4$ is hydrogen atom or an alkyl group of 1 to 3 carbon atoms and t is an integer

residues represented by the formula (iv):

$$\begin{array}{c} \text{—C}=\!=\!\text{C—} \\ | \\ R^8 \end{array} \quad (iv)$$

wherein $R^8$ is —(CHX$^5$)$_u$— in which $X^5$ is hydrogen atom or an alkyl group of 1 to 3 carbon atoms and u is an integer of 3 to 4, or —(CX$^6$=CX$^7$)$_v$— in which $X^6$ and $X^7$ are the same or different and each is hydrogen atom or an alkyl group of 1 to 3 carbon atoms and v is an integar of 2 to 3;

residues represented by the formula (v):

$$\text{—C(=CH}_2\text{)—CH}_2\text{—} \quad (v);$$

residues represented by the formula (vi):

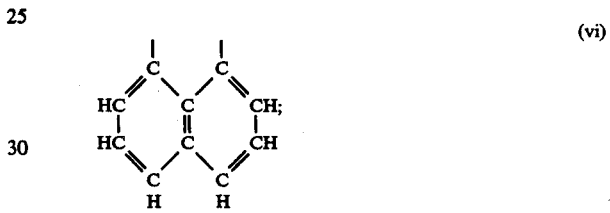

and the like.

Examples of the dibasic acid anhydrides are, for instance, maleic anhydride, succinic anhydride, methylsuccinic anhydride, phthalic anhydride, adipic anhydride, glutaric anhydride, glutaconic anhydride, itaconic anhydride, 1,8-naphthalic anhydride, citraconic anhydride, 1,2-cyclohexanedicarboxylic anhydride, 4-methyl-1,2-hexanedicarboxylic anhydride, cis-4-cyclohexene-1,2-dicarboxylic anhydride, 1-cyclohexene-1,2-dicarboxylic anhydride, an addition product prepared by Diels-Alder reaction of cyclopentadiene and maleic anhydride, and the like.

Generally the reaction of hydroxyl compounds and dibasic acid anhydrides proceeds in the presence of basic catalysts according to the following scheme.

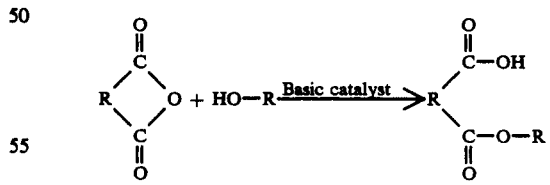

In this reaction, in order to obtain the desired product in a yield of more than 90% the amount of the basic catalyst to be used is at most 0.5% by mole of the dibasic acid anhydrides. According to the present inventors, research, however, when hydroxyvinyl ethers having a high cationic reactivity are used as the hydroxyl compounds, the desired reaction products cannot be obtained in the absence of a basic compound, as described hereinafter. Further, if the amount of the basic compound is about 0.5% by mole, not only the yield of the desired product becomes lower, but also the stability of the product is bad. Accordingly, the resulting products are not suitable to monomers for polymerization.

However, when the bases ③ are used in an amount of not less than 1% by mole of the dibasic acid anhydrides ② the yield becomes higher than 90% and, also since the resulting reaction mixture is stable, reduction of an effective yield can be prevented. The reason is assumed that the bases ③ prevent a reaction between the carboxyl group and the vinyl group and also prevent the obtained vinyl ethers (II) from undergoing formation of intramolecular ring. The bases ③ can be stoichiometrilly reacted with the carboxyl group. The bases ③ are present in the reaction system at an amount of not less than 1% by mole of the acid anhydrides ②, and in such a case the resulting reaction product is a mixture of the vinyl ethers (I) and (II).

The monomer compositions of the present invention can be prepared by adding the bases ③ to the mixture of the vinyl ethers (I) and (II), and reacting the bases ③ with the vinyl ethers(II). The bases ③ added after the half-esterification are the same as or different from the bases ③ used in the half-esterification. In this case the bases ③ can be stoichiomethrilly reacted with the carboxyl group of the vinyl ethers (II).

As the bases ③, the alkali metal compounds and the above-mentioned particular mono-functional basic compounds are used.

Preferable alkali metal compounds are compounds of Li, K or Na, and examples thereof are, for instance lithium hydroxide, sodium hydroxide, potassium hydroxide, lithium carbonate, sodium carbonate, potassium carbonate, sodium methylate, sodium ethylate, potassium methylate, and the like.

The particular mono-functional basic compounds are mono-functional basic compounds which contain nitrogen atom or phosphorous atom and have a pKa of 6 to 12, preferably 8 to 11. The basic compounds having a pKa in the range have an ability to form salts, and have a high stabilizing property to stabilize the vinyl ethers (II). Namely, basic compounds having a pKa higher than that of the carboxylic acids of the dibasic acid anhydrides have a high salt-forming ability. Preferable basic compounds have a pKa higher than that of the carboxylic acids to be reacted by 3 to 8. Suitable examples of the particular mono-functional basic compounds are ammonia, amines, phosphines, and the like. Particularly tertiary amines are preferable.

Examples of the amines are, for instance, methylamine, ethylamine, n-propylamine, isopropylamine, n-butylamine, isobutylamine, sec-butylamine, 1,2-dimethylpropylamine, 2-ethylhexylamine, tridecylamine, dimethylamine, diethylamine, di-n-propylamine, diisopropylamine, dibutylamine, diisobutylamine, di-sec-butylamine, di-2-ethylhexylamine, trimethylamine, triethylamine, tri-n-propylamine, tri-n-butylamine, N-methylbutylamine, N-ethylbutylamine, N, N-dimethylethylamine, N, N-dimethylisopropylamine, N, N-dimethyltetradecylamine, N, N-dimethyloctadecylamine, 2-methoxyethylamine, 3-ethoxyethylamine, cyclohexylamine, N, N-dimethylcyclohexylamine, dicyclohexylamine, benzylamine, N, N-dimethylbenzylamine, 4-methoxyphenylethylamine, ethanolamine, diethanolamine, triethanolamine, isopropanolamine, pyrrolidine, piperidine, 1-methylpiperidine, 4-methylpiperidine, morpholine, and the like.

Examples of the phosphines are, for instance, di-or tri-alkylphosphines such as trimethylphosphine, triethylphosphine, tripropylphosphine, tributylphosphine, trioctylphosphine, trilaurylphosphine, tristearylphosphine, dimethylphosphine, diethylphosphine, dibutylphosphine, dioctylphosphine or dilaurylphosphine; di-or tri-substituted alkylphosphines such as tris(3-hydroxypropyl)phosphine, tris(2-cyanoethyl)phosphine, tris(2-methoxyethyl)phosphine, tris(2-chloroethyl)phosphine, tris(2-methoxycarbonyl)phosphine, tris[2-(2-dimethylaminoethoxy)carbonyl)]phosphine, tris(2-ethoxycarbonyl)phosphine, bis(3-hydroxypropyl)phosphine or bis(2-cyanoethyl)phosphine; alicyclic phosphines such as dicyclopentylphosphine, dicyclohexylphosphine, tricyclopentylphosphine or tricyclohexylphosphine; di-or tri-arylphosphines such as triphenylphosphine, tri(4-methylphenyl)phosphine, disphenylphosphine or bis(4-methylphenyl)phosphine; di-or tri-aralkylphosphines such as tribenzylphosphine, triphenetylphosphine, dibenzylphosphine or diphenetylphosphine; phosphines containing phosphorous atom in a ring such as tetramethylenephosphine or tetramethylene-methylphosphine; phosphines in which two or three different organic residues are bonded to phosphorous atom such as diphenylmethylphosphine, diphenylethylphosphine or phenyldiethylphosphine; and the like. Particularly tributylphosphine and triphenylphosphine are preferable.

The reaction temperature is generally −80° to 100° C., preferably 0° to 50° C. Reaction solvents may be generally used, but may not be used. There may be used solvents excepting alcohols which are reactive to the dibasic acid anhydrides. Preferred solvents are ketones such as acetone, methyl ethyl ketone and methyl isobutyl ketone, because they do not cause the decrease of reactivity of the starting materials and also the coloring of the reaction products The bases ③ may generally be used in a molar ratio of 0.01 to 1.2 to the dibasic acid anhydrides ②, preferably 0.05 to 1.0.

According to the present invention, in order to inhibit the generation of halogen ions during the copolymerization of the vinyl ether monomer compositions with fluoroolefins, the amount of the vinyl ethers (I) in the monomer compositions must be regulated to not more than 50% by mole of the vinyl ethers (II).

When the amount of the vinyl ethers (I) is more than 50% by mole of the vinyl ethers (II), the amount of halogen ions generated is increased to develop a salting out effect, though the storage stability of the monomer compositions themselves is not influenced. Accordingly, aqueous compositions such as aqueous paints prepared therefrom have an inferior stability. Further, in case that those monomer compositions are used as electrodeposition paints, the aforementioned defects (1) to (3) occur.

When the vinyl ethers (I) is less than 1% by mole of the vinyl ethers (II), the generation of halogen ions can be inhibited, but the monomer compositions are unstable. As the result, not only a yield of the copolymers becomes low, but also properties (craters and dewetting) of the obtained coatings are inferior due to the resulting decomposition products. Further in case of the electrodeposition paints, undesirable ions such as acetic acid ion are increased.

According to the process of the present invention, it is possible to reduce the amount of fluorine ion in the obtained copolymers to 500 ppm or less and a total amount of fluorine ion and chloride ion in the copolymers to 1500 ppm or less, and to keep a yield of the copolymers at a level of 90% or more.

When carrying out the process of the invention, the monomer compositions and fluoroolefins may be charged batchwise or semi-batchwise. Preferable charging manner, however, is a continuous manner or a divided manner.

Namely, though stability of vinyl ethers having a carboxyl group and the yield of copolymers can be improved by using the vinyl ethers (I) having salts with basic compounds, it is not so much advantageous to convert the vinyl ethers (II) to the salts because the molecular weights of the resulting copolymers become low due to chain-transfer reaction by the basic compounds. Accordingly it is preferable to retain a part or major amount of the vinyl ethers in a form of free carboxyl group.

As explained above, however, monomer compositions containing vinyl ethers (II) having a free carboxyl group are inferior in stability. Accordingly when the monomers are charged batchwise, the rate of decomposition of the vinyl ethers (II) is fast even if the vinyl ethers (I) of the salt form are present. As a result, the yield of copolymers becomes low, and the polarization of vinyl ether units in the copolymers occurs. Further the obtained coatings have craters and are inferior, in dewetting and in weatherability. Therefore, the process of the present invention may preferably be carried out by continuously or dividedly charging the monomers The copolymerization system fundamentally comprises the vinyl ether monomer composition, the fluoroolefin, a solvent and a polymerization initiator. Polymerization processes used in the present invention are emulsion polymerization, dispersion polymerization, solution polymerization and the like.

According to the continuous charging or divided charging process, first a polymerization reaction is charged with a given amount of the fluorolefins, and then charged with the vinyl ether monomer compositions, other comonomers and polymerization initiators in a divided manner by a given amount or in a continuous manner at a constant charging rate or at a successively changing rate. Also, while maintaining pressure of the fluoroolefins at a predetermined level, the reaction mixture comprising the vinyl ether monomer compositions, other comonomers and the initiators may be supplied to a polymerization reactor in a divided manner by a given amount, or at a constant or successively changing rate.

A total amount of the vinyl ether monomer compositions is supplied over 1 to 10 hours by dividing the total amount by two or more, preferably three or more, or at a constant or successively changing rate, and subsequently the polymerization reaction is continued for another 3 to 30 hours.

The polymerization temperature is generally −20° to 150° C., preferably 5° to 95° C., which may be optionally changed depending on the kind of initiator or solvent. Also the reaction pressure may be optionally selected, and is generally 0 to 50 kg/cm²G.

Examples of the fluoroolefins are, for instance, tetrafluoroethylene, chlorotrifluoroethylene, hexafluoropropylene, trifluoroethylene, vinylidene fluoride, vinyl fluoride, and the like.

In the present invention, the reaction molar ratio of the vinyl ethers (I) or (I) and (II)/the fluoroolefins is generally 0.1–80/20–99.9.

The fluorine-containing copolymers preferably contain, when using as aqueous paints, the vinyl ethers (I) or (I) and (II) in an amount of 5 to 60% by mole for improving water-solubility of the copolymer. Particularly for electrodeposition coatings, not less than 30% of the carboxyl group of the vinyl ethers is neutralized. As the neutralizing agents, the above-mentioned basic compounds 3 may be used.

When using the fluorine-containing copolymers as organic solutions, i.e. organic solvent type paints, the content of the vinyl ethers (I) or (I) and (II) is preferably 1 to 15% by mole in view of adhesive property to substrates, and preferably 2 to 10% by mole in view of dispersibility of pigments.

The fluorine-containing copolymers may contain various ethylenic unsaturated compounds in an amount of not more than 80% by mole of the copolymer, in addition to the vinyl ethers and the fluoroolefins. Examples of the copolymerizable ethylenic unsaturated compounds are, for instance, an alkyl vinyl ether or vinyl ester represented by the formula:

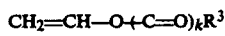

wherein $R^3$ is an aliphatic residue of 1 to 17 carbon atoms, an alicyclic residue of 3 to 17 carbon atoms, a fluoroalkyl residue of 1 to 20 carbon atoms, a hydroxyl-containing aliphatic residue of 1 to 17 carbon atoms, a hydroxyl-containing alicyclic residue of 3 to 17 carbon atoms or a hydroxyl-containing aromatic residue of 6 to 20 carbon atoms, and k is 0 or 1. Examples are, for instance, methyl vinyl ether, ethyl vinyl ether, n-propyl vinyl ether, isopropyl vinyl ether, n-butyl vinyl ether, isobutyl vinyl ether, t-butyl ether, n-pentyl vinyl ether, n-hexyl vinyl ether, n-octyl vinyl ether, 2-ethylhexyl vinyl ether, cyclohexyl vinyl ether, lauryl vinyl ether, stearyl vinyl ether, 2,2,2-trifluoroethyl vinyl ether, 2,2,3,3-tetrafluoropropyl vinyl ether, 2,2,3,3,3-pentafluoropropyl vinyl ether, 2,2,3,3,4,4,5,5-hephafluorobutyl vinyl ether, vinyl acetate, vinyl propyonate, vinyl butyrate, vinyl pivalate, vinyl caproate, vinyl laurate, vinyl lauroate, vinyl Versalate ®, vinyl cyclohexancarboxylate, 4-hydroxylbutyl vinyl ether, 2-hydroxyethyl vinyl ether, 3-hydroxy-n-propyl vinyl ether, 2-hydroxyisopropyl vinyl ether, 2-hydroxy-2-methylethyl vinyl ether, 2-hydroxy-1,1-dimethylethyl vinyl ether, 4-hydroxycyclohexyl vinyl ether, 3-hydroxycyclohexyl vinyl ether, 2-hydroxycyclohexyl vinyl ether, 4-hydroxylbenzoxy vinyl, and the like.

Further a compound represented by the following formula may be used.

wherein $X^8$ is hydrogen atom, chlorine atom, fluorine atom, methyl or trifluoromethyl, $R^9$ is hydrogen atom, chlorine atom, an aliphatic residue of 1 to 17 carbon atoms, a hydroxyl-containing aliphatic residue of 1 to 17 carbon atoms, an alicyclic residue of 3 to 17 carbon atoms or a fluoroalkyl residue of 1 to 20 carbon atoms, and m is 0 or 1. Examples are, for instance, ethylene, propylene, 1-butene, isobutene, styrene, vinyl chloride, vinylidene chloride, isobutyl acrylate, methyl acrylate, ethyl methacrylate, 2,2,3,3,3-pentafluoropropyl α-fluoroacrylate, 2,2,3,3,4,4,5,5,6,6,7,7-dodecafluoropentyl α-trifluoromethylacrylate, 2-hydroxyethyl methacrylate, cyclohexyl acrylate, 2,2,3,3,4,4,5,5,6,6,7,7,8,8,9,9,10,10,11,11,12,12,13,13,14,-14,15,15,15-nonacosafluoropentadecyl acrylate, 2-hyeroxypropyl α-chloracrylate, octyl α-chloroacrylate, octadecyl acrylate, and the like.

In addition, a compound represented by the formula:

$$CH_2=CHCH_2X^9$$

wherein $X^9$ is chlorine atom, hydroxylgroup or an alkyloxy group of 1 to 8 carbon atoms, may also be used. Examples are, for instance, allyl alcohol allyl chloride, allyl methyl ether, allyl isopropyl ether, allyl octyl ether, and the like.

If necessary, a small amount of divinyl ethers or trivinyl ethers which are salts of the vinyl ethers (II) with polyvalent metals (e.g. Mg, Ca, Zn or Al) or polyfunctional compounds containing nitrogen atom or phosphorous atom (e.g. polyamines such as alkyldiamines or alkyltriamines, polyphosphines such as alkyldiphosphines or alhyltriphosphines), may be present in the copolymerization system as copolymerizabhle monomers. In this case, the reaction products are partially gelled and be useful for matting agents.

Examples of polymerization solvents are, for instance, halogenated hydrocarbons such as trichlorotrifluoroethane and dichlorotetrafluoroethane; ketones such as acetone, methyl ethyl ketone and methyl isobutyl ketone; esters such as ethyl acetate and butyl acetate; aromatic hydrocarbons such as toluene and xylene; alcohols such as methanol, ethanol, propanol and butanol; glycol ethers such as ethyl cellosolve, butyl cellosolve, monoglyme and diglyme; water; and the like.

In case that the fluorine-containing copolymers are used for aqueous paints or electrodeposition paints, particularly suitable polymerization solvents are mixed solvents of ketones having 3 to 20 carbon atoms and alcohols having the formula:

$$Y^4-O+CH_2CH-O)_lH$$
$$\quad\quad\quad\quad |$$
$$\quad\quad\quad\quad Y^5$$

wherein $Y^4$ is an alkyl group having 1 to 8 carbon atoms, $Y^5$ is hydrogen atom or methyl, l is zero or an integer of 1 to 20. Preferred mixing molar ratio of ketones/ alcohols is 1/10 to 10/1, particularly ⅛ to 5/1. The mixed solvents may be used in an amount of 4/1 to ¼ of the total amount of the monomers. When using the mixed solvents, the polymerization reaction can be carried out more stably without generating gellation, and thus more excellent coating films can be obtained. Preferred ketones are, for example, acetone, methyl ethyl ketone, methyl isobutyl ketone, dibutyl ketone, acetyl acetone and cyclohexanone, and particularly acetone or methyl ethyl ketone, most preferably acetone. Examples of the alcohols are, for instance, methanol, ethanol, isopropanol, n-butanol, t-butanol, methyl cellosolve, butyl cellosolve, butyl carbitol, methyl carbitol and a mixture thereof, and particularly methanol, ethanol, isopropanol or n-butanol.

Examples of the initiating agents are, for instance, persulfates such as ammonium persulfate and potassium persulfate; redox type initiating agents comprising persulfates and sulfites (e.g. potassium sulfite, sodium sulfite or the like) and acid sulfites (e.g. acid potassium sulfite, acid sodium sulfite or the like); organic peroxides such as diisopropyl peroxydicarbonate, tert-butyl peroxybutyrate, benzoyl peroxide and isobutyryl peroxide; azo compounds such as azobisisobutylonitrile, azobisvaleronitrile; and the like. The initiating agents may be generally used in an amount of 0.001 to 5% by weight of the total weight of the monomers, preferably 0.05 to 2.0% by weight.

The present invention is more particularly described and explained by means of the following Examples. It is to be understood that the present invention is not limited to the Examples, and various changes and modifications may be made in the invention without departing from the spirit and scope thereof.

REFERENCE EXAMPLE 1

A flask of 1000 ml was charged with 405 g (2.63 mole) of 1,2-cyclohexanedicarboxylic anhydride (as an acid anhydride) and 40 g of acetone, and then 2.63 g (0.26 mole) of triethylamine (base: pKa=10.72) was added thereto. The mixture was stirred for 5 minutes with a magnetic stirrer.

To the mixture was added dropwise 305 g (2.63 mole) of hydroxybutyl vinyl ether at a rate of 2 g/min. while keeping the mixture at 0° to 10° C. by cooling with ice water.

The resulting reaction mixture was subjected to Fourier transform nuclear magnetic resonance analysis (FT—NMR, $^{13}C$, tetramethylsilane standard). As a result, it was confirmed that the vinyl ether (I) of the invention having the following formula (hereinafter referred to as "cHHEM salt") and the corresponding free vinyl ether (II) (hereinafter referred to as "cHHEM") were yielded in a molar ratio of approximately 10/85. The data of chemical shifts of each carbon atoms (designated by a to m) are shown in the followings.

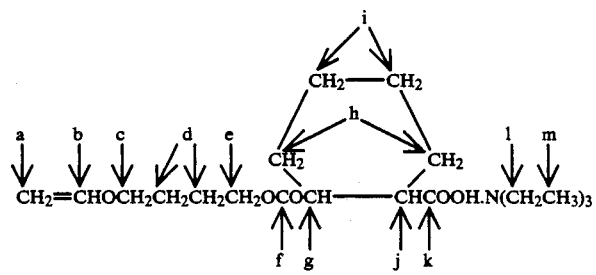

δ (ppm) = 85.6 (a), 151.5 (b), 67.2 (c), 25.3–25.6 (d), 62.8 (e), 173.3 (f), 42.9 (g), 27.4 (h), 24.4 (i), 43.5 (j), 176.2 (k), 44.9 (l), 9.1 (m)

REFERENCE EXAMPLE 2

The monomer composition of cHHEM salt and cHHEM were prepared by repeating the same procedures as in Reference Example 1 except that an amount of triethylamine was changed to an amount shown in Table 1. The yields determined by the FT-NMR analysis are shown in Table 1.

In addition, decomposition rates (%) of the resulting reaction products, when they were stored at 20° C. and −20° C., were determined by $^{13}$C—NMR analysis. The results are also shown in Table 1.

centration of copolymer was 64.3% by weight (theoretical concentration of copolymer: 65% by weight).

Concentrations of fluorine ion and chlorine ion in the obtained copolymer were measured.

TABLE 1

| Experiment No. | Amount of triethylamine (% by mole to acid anhydride) | Yield of vinyl ethers (%) | | | Decomposition rate (%) | |
|---|---|---|---|---|---|---|
| | | cHHEM salt | cHHEM | Total | 3 hrs after at 20° C. | 24 hrs after at −20° C. |
| 1 | 50 | 50 | 47 | 97 | 5 | 2 |
| 2 | 10 | 10 | 85 | 95 | 9 | 3 |
| 3 | 1 | 1 | 89 | 90 | 13 | 5 |
| 4 | 0.3 | 0.3 | 84.7 | 85 | 26 | 7 |

Reference Example 3

To the reaction product obtained in Experiment No. 4 of Reference Example 2 (cHHEM salt/cHHEM =0.1/84.9, molar ratio) was added the base shown in Table 2 to convert cHHEM into cHHEM salt. Decomposition rates of the resulting products were determined in the same manner as in Reference Example 2. The results are shown in Table 2.

TABLE 2

| Experiment No. | Base | | | Decomposition rate (%) | |
|---|---|---|---|---|---|
| | Kind | Molar ratio to cHHEM | pKa | 3 hrs after at 20° C. | 24 hrs after at −20° C. |
| 5 | Sodium hydroxide | 1.0 | — | 0 | 0 |
| 6 | Ammonia | 1.0 | 9.25 | 0 | 0 |
| 7 | Triethanolamine | 1.0 | 7.762 | 0 | 0 |
| 8 | Tributylphosphine | 1.0 | 8.4 | 0 | 0 |
| 9 | Prydine | 1.0 | 5.22 | 21 | 8 |
| 10 | Dimethylformamide | 1.0 | <6 | 18 | 6 |
| 11 | Aniline | 1.0 | 4.596 | 20 | 7 |

As is clear from Table 2, the basic compounds having a pKa of lower than 6 less contribute to stability of cHHEM due to their weak base.

EXAMPLE 1

A glass autoclave of 800 ml with a stirrer was charged with 160 g of monoglyme, and then the monoglyme was frozen with a liquid nitrogen and deaerated. After the autoclave was charged with 128.2 g of chlorotrifluoroethylene (hereinafter referred to as "CTFE"), the reaction system was heated to 65° C. A monomer mixture of 72.83 g of the vinyl ether monomer composition (cHHEM salt/cHHEM =10/85, molar ratio) prepared in Reference Example 1, 49.9 g of hydroxybutyl vinyl ether (hereinafter referred to as "HBVE"), 61.4 g of vinyl ester of carboxylic acid having a C$_{10}$ alkyl group (VEOVA ® available from Shell Chemical, Co.: hereinafter referred to as "VA") and 1.64 g of azobisisobutyronitrile (hereinafter referred to as "AIBN") which was frozen with a liquid nitrogen and deaerated, was continuously introduced into the autoclave for 4 hours. The reaction system was kept at 65° C. After continuous charging, the reaction was continued at 65° C. for 16 hours to obtain a fluorine-containing copolymer having a carboxyl group. The amount of yield was 451 g (yield: 98.9%) and the con- Concentration of fluorine ion in the polymer: 220 ppm.

Concentration of chlorine ion in the polymer: 351 ppm (Method for measuring halogen ions).

1.0 g of the fluorine-containing polymer is dissolved in 100 g of methyl isobutyl ketone, and 100 g of a deionized water is added thereto. After shaking well the mixture in a 300 cc separating funnel, an aqueous phase is collected. Concentrations of fluorine ion and chlorine ion in the aqueous phase are measured by ion chromatography. The ion concentration is represented by a value on the basis of the polymer.

EXAMPLES 2 to 5 and COMPARATIVE EXAMPLES 1 to 2

The same copolymerization procedures as in Example 1 were repeated except that the polymerization systems shown in Table 3 were employed to obtain the fluorine-containing copolymers. Table 3 also shows the amounts of yield, copolymer concentrations, fluorine ion concentrations and chlorine ion concentration.

In Table 3, "EVE" represents ethyl vinyl ether, "Succinic acid HEM" represents

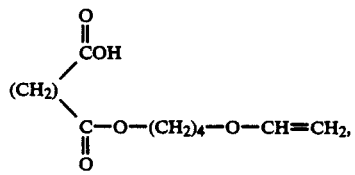

and "Succinic acid HEM salt" represents triethylamine salt thereof.

TABLE 3

|  |  | Example No. | | | | | Comp. Example No. | |
| --- | --- | --- | --- | --- | --- | --- | --- | --- |
|  |  | 1 | 2 | 3 | 4 | 5 | 1 | 2 |
| Monomer mixture (g) | CTFE | 128.2 | 128.2 | 128.2 | 128.2 | 128.2 | 128.2 | 128.2 |
|  | HBVE | 49.9 | 49.9 | 49.9 | 48.8 | 49.9 | 49.9 | 49.9 |
|  | VA | 61.4 | 61.4 | 25.7 | 73.3 | 61.4 | 61.4 | 61.4 |
|  | EVE | — | — | 13.0 | — | — | — | — |
|  | cHHEM salt | 10.0 | 28.9 | — | 7.83 | 1.0 | 70.2 | 0.13 |
|  | cHHEM | 62.8 | 49.1 | — | 50.9 | 69.5 | — | 70.1 |
|  | Succinic acid HEM | — | — | 41.2 | — | — | — | — |
|  | Succinic acid HEM salt | — | — | 28.1 | — | — | — | — |
|  | AIBN | 1.64 | 1.64 | 2.00 | 1.64 | 1.64 | 1.64 | 1.64 |
|  | Monoglyme | 160 | 155 | 129 | 157.7 | 158 | 136.3 | 157 |
| Results | Amount of yield (g) | 451 | 449 | 399 | 451 | 428 | 445 | 420 |
|  | Copolymer conc. (%) | 64.3 | 64.4 | 64.0 | 63.9 | 60.1 | 63.8 | 52.3 |
|  | Yield (%) | 98.9 | 99.1 | 98.5 | 98.3 | 92.5 | 98.2 | 80.5 |
|  | 1 Fluorine ion conc. (ppm) | 220 | 462 | 470 | 175 | 158 | 1567 | 140 |
|  | 2 Chlorine ion conc. | 351 | 712 | 795 | 314 | 298 | 1492 | 305 |
|  | 1 + 2 (ppm) | 571 | 1174 | 1265 | 489 | 456 | 3059 | 445 |

COMPARATIVE EXAMPLE 3

The same procesures as in Example 1 were repeated except that the autoclave was charged batchwise with the monomers, solvent and initiator to obtain a copolymer (amount of yield: 440 g, copolymer concentration: 55.3% by weight).

EXAMPLES 6 to 7 and COMPARATIVE EXAMPLES 4 to 5

The same procedures as in Example 1 were repeated except that the polymerization systems shown in Table 4 were employed to obtain copolymers. Amount of yield and copolymer concentrations are shown in Table 4. Examples 6 and 7 were the continuous process, and Comparative Examples 4 and 5 were the batch process.

EXAMPLE 8

The autoclave was charged with 128.2 g of CTEF in the same manner as in Example 1 and then heated to 65° C. Separately a monomer mixture was prepared by mixing 72.83 g of the vinyl ether monomer composition of Reference Example 1 (cHHEM salt/cHHEM =10/85, molar ratio), 49.9 g of HBVE, 61.4 g of VA and 1.64 g of AIBN, and freezing with a liquid nitrogen, then deaerating. The monomer mixture was divided into three portions, and the first portion (⅓) was initially introduced. While maintaining the temperature of the reaction system at 65° C., the remaining portions were dividedly supplied into the autoclave twice every 1.5 hours. After the charge, the polymerization reaction was continued at 65° C. for 17 hours to obtain 435 g of a fluorine-containing copolymer having a carboxyl group (copolymer concentration: 62.3% by weight).

TABLE 4

|  |  | Ex. 6 | Comp. Ex. 4 | Ex. 7 | Comp. Ex. 5 | Ex. 8 |
| --- | --- | --- | --- | --- | --- | --- |
| Monomer mixture (g) | CTFE | 128.2 | 128.2 | 128.2 | 128.2 | 128.2 |
|  | HBVE | 49.9 | 49.9 | 58.0 | 58.0 | 49.9 |
|  | VA | 61.4 | 61.4 | — | — | 61.4 |
|  | cHHEM salt | 28.9 | 28.9 | 18.6 | 18.6 | 28.9 |
|  | cHHEM | 49.1 | 49.1 | 121.5 | 121.5 | 49.1 |
|  | AIBN | 2.00 | 2.00 | 2.11 | 2.11 | 1.64 |
|  | Monoglyme | 155 | 155 | 200 | 200 | 155 |
| Polymerization condition | Charge time (hr) |  |  |  |  |  |
|  | Continuous | 4.0 | — | 6.0 | — | — |
|  | Divided | — | — | — | — | Initial ⅓ portion twice every 1.5 hr |
|  | Polymerization time (hr) | 20 | 20 | 20 | 20 | 20 |
|  | Reaction temp. (°C.) | 65 | 65 | 65 | 65 | 65 |
| Results | Amount of yield (g) | 438 | 431 | 506 | 470 | 435 |
|  | Copolymer conc. (%) | 63.8 | 59.8 | 59.4 | 50.6 | 62.3 |

REFERENCE EXAMPLE 4

(PREPARATION OF ELECTRODEPOSITION COATING COMPOSITION)

The copolymer solution obtained in Example 1 were adjusted to a copolymer concentration of 65.0% by weight, and then 3.9 parts by weight of dimethylethanolamine (0.9 equivalent per acid value of the copolymer) was added to 100 parts by weight of the solution to neutralize the solution.

To the solution were added 10 parts by weight of butyl cellosolve, 20 parts by weight of Melanin 620 (80% methyl methylolated melamine resin available from Hitachi Chemical Co., Ltd.; solid content: 70% by weight) and 990 parts by weight of deionized water to prepare an Electrodeposition coating composition 1.

An Electrodeposition coating composition 2, Comparative electrodeposition coating composition 1 and Comparative electrodeposition coating composition 2 were prepared by repeating the above-mentioned procedures except that the fluorine-containing copolymer prepared in Example 6, Comparative Example 3 and Comparative Example 4, respectively.

REFERENCE EXAMPLE 5

(ELECTRODEPOSITION COATING)

An electrodeposition coating bath was filled with the Electrodeposition coating composition 1 to 2 or the Comp. electrodeposition coating composition 1 to 2. In each bath, a 6063S aluminum alloy plate which was subjected to alumite treatment (thickness of alumite film: 9 μm) was employed as an article to be coated (anode), and was electrodeposited for 3 minutes (bath temperature: 22° C., voltage:140 V), followed by washing the aluminum alloy plate with water and baked at 180° C. for 30 minutes to obtain an electrodeposition coating.

The thickness of the coating was measured with a thickness meter (Barma Scope EW available from Kabushiki Kaisha Katt Kagaku Kenkyusho). Coating properties such as craters and dewetting were observed with naked eyes.

The results are shown in Table 5.

Evaluation of craters and dewetting is as follows:

⊚ : No crater and dewetting is observed.

O  Less crater and dewetting is observed, but a very small amount of craters and dewetting are observed once or twice per 10 times.

Δ: A small amount of craters and dewetting are observed every time.

X:Craters and dewetting are observed all over the surface.

TABLE 5

| Electrodeposition coating composition No. | Properties of coating | | |
|---|---|---|---|
| | Crater | Dewetting | Thickness (μm) |
| Coating composition 1 | ⊚ | ⊚ | 11 |
| Coating composition 2 | O | O | 12 |
| Comp.Coating composition 1 | X | X | 12 |
| Comp.Coating composition 2 | Δ | X | 13 |

According to the present invention, when the vinyl ether monomer compositions containing the vinyl ethers (I) in an amount of 1 to 50% by mole of the vinyl ethers (II) are employed, generation of halogen ions can be inhibited. Further by supplying the monomer compositions in a continuous or divided manner, homogeneous fluorine-containing copolymer can be prepared in a high yield. Electrodeposition coating compositions prepared therefrom are stable and excellent in coating properties, and can give coatings having a good weatherability and less crater and dewetting.

EXAMPLE 9

The same procedures as in Example 1 were repeated except that a mixed solvent of 140.2 g of acetone and 19.8 g of ethanol was used to obtain a fluorine-containing copolymer having a carboxyl group (amount of yield:455 g, copolymer concentration 64.3% by weight).

EXAMPLES 10 to 13

The same procedures as in Example 1 were repeated except that the mixed solvent shown in Table 6 was used to obtain a fluorine-containing copolymer. Amounts of yield and copolymer concentrations are shown in Table 6.

TABLE 6

| | Composition (g) | Ex. 9 | Ex. 10 | Ex. 11 | Ex. 12 | Ex. 13 |
|---|---|---|---|---|---|---|
| Monomers | HBVE | 49.9 | 39.0 | 49.9 | 49.9 | 49.9 |
| | cHHEM of Ref. Ex. 1 | 72.83 | 62.51 | 72.83 | 72.83 | 72.83 |
| | CTFE | 128.2 | 128.2 | 128.2 | 128.2 | 128.2 |
| | EVE | — | 31.3 | 22.3 | — | — |
| | VA | 61.4 | — | — | 61.4 | 61.4 |
| Initiator | (AIBN) | 1.64 | 1.50 | 1.64 | 1.64 | 1.64 |
| Solvents | Acetone | 140.2 | 156.3 | 140.0 | — | 109.2 |
| | Methyl ethyl ketone | — | — | — | 142.2 | — |
| | Ethanol | 19.8 | — | — | 19.8 | — |
| | Isopropanol | — | 10.1 | — | — | — |
| | Methanol | — | — | 34.4 | — | — |
| | Butyl cellosolve | — | — | — | — | 50.8 |
| Amount of yield (g) | | 455 | 413 | 430 | 443 | 441 |
| Copolymer conc. (% by weight) | | 64.7 | 59.4 | 58.7 | 63.9 | 63.8 |
| Theoretical conc. (% by weight) | | 65.0 | 60.0 | 60.0 | 65.0 | 65.0 |

EXAMPLE 14

The varnish containing the fluorine-containing copolymer obtained in Example 9 was diluted with isopropanol (IPA) to a copolymer concentration of 25% by weight. The dehalogenated varnish with the copolymer concentration of 25% by weight was concentrated under reduced pressure to give a varnish with a copolymer concentration of 65% by weight. To 100 parts by weight of the varnish was added 3.9 parts by weight of dimethyl ethanol amine (0.9 equivalent per a copolymer acid value) to partially neutralize. An electrodeposition coating composition was prepared according to the following formulation.

| | Parts by weight |
|---|---|
| Varnish | 100 |
| Butyl Cellosolve | 10 |
| 80% methyl methylolated melamine resin (commercially available under the trade mark "Melane 620" made by Hitachi Chemical Co., Ltd., solid content: 70%) | 20 |
| Deionized water | 990 |

The obtained composition was placed in an electrocoating bath and was coated onto an alumite-treated aluminum alloy plate as anode (6063S aluminum alloy plate having a 9 μm thick anodic oxidation coating subjected to sealing) by applying an electric current to the bath at a bath temperature of 20° C. and a voltage of 140 V for 3 minutes. The coated plate was washed with water, and was baked and cured at 180° C. for 30 minutes.

With respect to the thus formed coating film, the thickness, gloss, weatherability, adhesion, boiling water resistance, alkali resistance after boiling water resistance test, acid resistance, throwing property, smoothness, pencil hardness and impact resistance, and as to the composition stability were measured by the following methods.

The results are shown in Table 7.

Film thickness (μm)

The thickness is measured by using a film thickness meter ("PERMASCOPE EW" made by Kabushiki Kaisha Kett Kagaku Kenkyusho).

Gloss (%)

The 60° specular gloss is measured by using a glossmeter ("VG-2PD" made by Nippon Dnshoku Kogyo Kabushiki Kaisha).

Weatherability (%)

The accelerated weathering test is made for 360 hours using a Weather-O-Meter (made by Suga Shikenki Kabushiki Kaisha) under conditions: dew cycle, irradiation/darkness = 60 min./60 min.; black panel temperature 63° C. The gloss retention rate (%) is measured.

Adhesion

The coating film is cross-cut by a knife into 100 squares each having a size of 1×1 mm, and a cellophane adhesive tape is repeatedly stuck and peeled off 10 times. The number of remaining squares is counted.

Boiling water resistance

The boiling water resistance is measured according to Japanese Industrial Standard (JIS) H 8602.

Alkali resistance after boiling water resistance test

The film after boiling water resistance test is dipped in a 1% aqueous solution of sodium hydroxide for 72 hours. The appearance of the film is observed with the naked eye as to whether blisters are produced or not.

Acid resistance

The film is dipped in a 5% aqueous solution of hydrochloric acid for 7 days and the appearance of the film is observed with the naked eye.

Appearance

Appearance is observed with naked eyes.

Stability of the composition

The electrodeposition coating composition is allowed to stand for one month at 30° C. and it is observed with naked eyes.

EXAMPLES 15 to 18

The same procedures as in Example 14 were that the fluorine-containing copolymer obtained in Examples 10 to 13 was used to give an electrodeposition coating composition. Using the composition, the electrodeposition coating was conducted in the same manner as in Example 14. The results are shown in Table 7.

TABLE 7

| Properties | Ex. 14 | Ex. 15 | Ex. 16 | Ex. 17 | Ex. 18 |
|---|---|---|---|---|---|
| Film thickness (μm) | 12 | 13 | 10 | 11 | 12 |
| Gloss (%) | 85 | 83 | 80 | 82 | 81 |
| Weatherability (%) | 81 | 79 | 83 | 77 | 79 |
| Adhesion | 100 | 100 | 100 | 100 | 100 |
| Boiling water resistance | No change | No change | No change | No change | No change |
| Alkali resistance after boiling water resistance | No change | No change | No change | No change | No change |
| Acid resistance | No change | No change | No change | No change | No change |
| Appearance | Good | Good | Good | Good | Good |
| Stability of the composition | Good | Good | Good | Good | Good |

What we claims is:

1. A process for preparing fluorine-containing copolymers which comprises copolymerizing fluoroolefins with vinyl ether monomer compositions comprising vinyl ethers of the formula (I):

$$CH_2=CHOR^1OC(=O)R^2C(=O)O(H)_nM \quad (I)$$

wherein $R^1$ is a divalent aliphatic residue of 2 to 10 carbon atoms, $R^2$ is a divalent organic residue, and M is an alkali metal, or a mono-functional basic compound which contains nitrogen atom or phosphorous atom and has a pKa of 6 to 12, and n is 0 when M is the alkali metal, and is 1 when M is other, and vinyl ethers of the formula (II):

$$CH_2=CHOR^1OC(=O)R_2C(=O)OH \quad (II)$$

wherein $R^1$ and $R^2$ are as defined above, and said monomer compositions containing the vinyl ethers (I) in an amount of 1 to 50% by mole of the vinyl ethers (II).

2. The process of claim 1, wherein the monomer compositions are dividedly supplied.

3. The process of claim 1, wherein the monomer compositions are continuously supplied.

4. The process of claim 1, wherein the alkali metal is a member selected from the group consisting of Na, K and Li.

5. The process of claim 1, wherein the basic compound has a pKa of 8 to 11.

6. The process of claim 1, wherein the basic compound is a member selected from the group consisting of ammonia, an amine and a phosphine.

7. The process of claim 6, wherein the basic compound is a tertiary amine.

8. The process of claim 1, wherein $R^2$ is a divalent hydrocarbon residue.

9. The process of claim 1, wherein $R^2$ is a residue represented by the formula (i):

$$-(CHX^1)_p(CH^2_2)_q- \quad (i)$$

wherein $X^1$ is hydrogen atom or an alkyl group of 1 to 3 carbon atoms, $X^2$ is hydrogen atom or an alkyl group of 1 to 3 carbon atoms, and p and q are 0 or an integer of 1 to 11, provided that they are not 0 at the same time; a residue represented by the formula (ii):

wherein $X^3$ is hydrogen atom or an alkyl group of 1 to 3 carbon atoms, r is O or an integer of 1 to 3, and s is an integer of 1 to 3; a residue represented by the formula (iii):

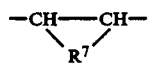

wherein $R^7$ is $+CHX^4)_{\overline{t}}$ in which $X^4$ is hydrogen atom or an alkyl group of 1 to 3 carbon atoms and t is an integer

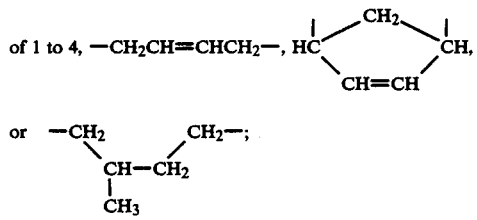

a residue represented by the formula (iv):

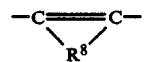

wherein $R^8$ is $+CHX^5)_{\overline{u}}$ in which $X^5$ is hydrogen atom or an alkyl group of 1 to 3 carbon atoms and u is an integer of 3 to 4, or $+CX^6=CX^7)_{\overline{v}}$ in which $X^6$ and $X^7$ are the same or different and each is hydrogen atom or an alkyl group of 1 to 3 carbon atoms and v is an integer of 2 to 3;
a residue represented by the formula (v):

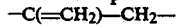

a residue represented by the formula (vi):

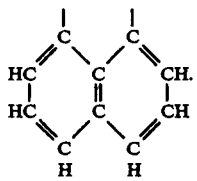

10. The process of claim 1, wherein the fluoroolefin is a member selected from the group consisting of tetrafluoroethylene, chlorotrifluoroethylene, hexafluoropropylene, trifluoroethylene, vinylidene fluoride and vinyl fluoride.

11. The process of claim 1, wherein the copolymerization is carried out in mixed solvents of ketones having 3 to 20 carbon atoms and alcohols having the formula:

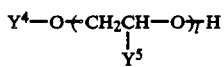

wherein $Y^4$ is an alkyl group having 1 to 8 carbon atoms, Y is hydrogen atom or methyl, l is zero or an integer of 1 to 20, and a mixing ratio of the ketones/alcohols being 1/10 to 10/1 by mole.

* * * * *